(12) United States Patent
Goulart et al.

(10) Patent No.: US 10,789,636 B2
(45) Date of Patent: *Sep. 29, 2020

(54) ADD ITEMS FROM PREVIOUS ORDERS

(71) Applicant: Wal-Mart Stores, Inc., Bentonville, AR (US)

(72) Inventors: Valerie Goulart, Seattle, WA (US); Lauren Jill Patti, San Francisco, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 192 days.

This patent is subject to a terminal disclaimer.

(21) Appl. No.: 15/950,062

(22) Filed: Apr. 10, 2018

(65) Prior Publication Data

US 2018/0232795 A1 Aug. 16, 2018

Related U.S. Application Data

(63) Continuation of application No. 13/928,851, filed on Jun. 27, 2013, now Pat. No. 9,940,660.

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0255* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 5,970,470 A | 10/1999 | Walker et al. | |
| 6,641,037 B2 | 11/2003 | Williams | |
| 7,130,814 B1 | 10/2006 | Szabo et al. | |
| 7,249,708 B2 | 7/2007 | McConnell et al. | |

(Continued)

FOREIGN PATENT DOCUMENTS

| | | |
|---|---|---|
| EP | 0856812 | 8/1998 |
| WO | 2001020527 | 3/2001 |

(Continued)

OTHER PUBLICATIONS

Lucky, W.D., "What makes Online Grocers Work? A Case Study Analysis of Factors Contributing to Online Grocery Store Profitability," Florida International University, Doctoral Dissertation 2008.

*Primary Examiner* — Nicholas D Rosen
(74) *Attorney, Agent, or Firm* — Bryan Cave Leighton Paisner LLP

(57) ABSTRACT

A computer-implemented method for providing a list of frequently purchased items by a user from a retailer to a computing device corresponding to the user includes receiving a request to generate the list of frequently purchased items. A purchase history of the user is obtained in response to the request, the purchase history including a plurality of previously purchased items. A number of purchases for each of the purchased items within a predetermined time period is monitored. The list of frequently purchased items is generated based on the monitored number of purchases for each of the purchased items. The generated list of frequently purchased items is transmitted to the computing device.

20 Claims, 6 Drawing Sheets

(56) References Cited

U.S. PATENT DOCUMENTS

| | | |
|---|---|---|
| 8,078,615 B2 | 12/2011 | Smith |
| 8,340,666 B2 | 12/2012 | Ramer |
| 8,370,203 B2 | 2/2013 | Dicker |
| 8,538,824 B1 | 9/2013 | McKay |
| 8,583,512 B1 | 11/2013 | Gupta |
| 8,620,754 B2 | 12/2013 | Fisher |
| 8,620,767 B2 | 12/2013 | Linden |
| 9,595,062 B2 | 3/2017 | Goulert |
| 9,940,660 B2 * | 4/2018 | Goulart .............. G06Q 30/0631 |
| 2001/0021914 A1 | 9/2001 | Jacobi |
| 2001/0032130 A1 | 10/2001 | Gabos et al. |
| 2002/0082925 A1 | 6/2002 | Herwig |
| 2003/0130858 A1 | 7/2003 | Pickover |
| 2004/0176966 A1 | 9/2004 | Chen |
| 2005/0055385 A1 | 3/2005 | Sinha |
| 2005/0080683 A1 | 4/2005 | Jordan |
| 2005/0171855 A1 | 8/2005 | Westphal |
| 2007/0094080 A1 | 4/2007 | Wiken |
| 2008/0086386 A1 | 4/2008 | Bell |
| 2008/0226142 A1 | 9/2008 | Pennella et al. |
| 2009/0289111 A1 | 11/2009 | Motycka et al. |
| 2010/0306080 A1 | 12/2010 | Trandal et al. |
| 2011/0184831 A1 | 7/2011 | Dalgleish |
| 2011/0238522 A1 | 9/2011 | Stevens et al. |
| 2011/0258072 A1 | 10/2011 | Kerker |
| 2012/0277991 A1 | 11/2012 | Wagner |
| 2013/0066740 A1 | 3/2013 | Ouimet et al. |
| 2013/0138530 A1 | 5/2013 | Westphal |
| 2013/0218721 A1 | 8/2013 | Borhan et al. |
| 2013/0226729 A1 | 8/2013 | Reed et al. |
| 2013/0290234 A1 | 10/2013 | Harris |
| 2013/0317938 A1 | 11/2013 | Zhao |

FOREIGN PATENT DOCUMENTS

| | | |
|---|---|---|
| WO | 2002041106 | 5/2002 |
| WO | 2012103463 | 8/2012 |

* cited by examiner

ADD ITEMS FROM PREVIOUS ORDERS

CROSS-REFERENCE TO RELATED APPLICATIONS

This application is a continuation of U.S. patent application Ser. No. 13/928,851, filed Jun. 27, 2013. U.S. patent application Ser. No. 13/928,851 is incorporated herein by reference in its entirety.

BACKGROUND INFORMATION

Field of the Disclosure

The present invention relates generally to methods for selecting an item a user intends to purchase from a list of one or more items previously purchased by the user. In particular, examples of the present invention are related to techniques for generating a list of frequently purchased items based on a purchase history of a user and transmitting the generated list of frequently purchased items to a computing device corresponding to the user.

Background

Modern technology offers today's consumers a wide range of tools for interacting in the marketplace. Using computing devices, e.g., smart phones, tablets or stationary devices, consumers have access to a wide range of information and a broad array of shopping tools for purchasing anything from electronic devices to simple groceries from retailers. The consumer may select various items intended to be purchased using the computing device based on previously purchased items from past orders by the consumer.

It is known, for example, to allow the consumer to add items the consumer purchased from previous orders to a current order, e.g., the consumer may select a button displayed upon the computing device to add items previously purchased to an electronic shopping cart corresponding to the user. For instance, an item a consumer intends to purchase during a current order can be selected by retrieving the item from a previous order at which the item was previously purchased. One drawback of adding items from previous orders is that the consumer must undertake a navigation process to individually view each previous order to see if that order contains the item the user intends to purchase. This navigation process can include selecting multiple graphical elements corresponding to each previous order to view the items purchased therein. However, if the item the user intends to purchase is not included within the previous order the user has selected, the user must navigate back to select another previous order to see if that order contains the item the consumer intends to purchase. This can be a hassle for the user to remember which previous order includes the item the consumer is searching for.

It is further known, for example, for consumers to access a database maintained by a retailer to view every item the consumer has previously purchased. For example, this database can be accessed by the consumer through a user input selecting a "favorites" icon displayed upon a computing device through use of an application furnished by the retailer or a website furnished by the retailer. The user may select an item the user intends to purchase during a current order by locating the item as one of the previously purchased items in the database. One drawback of selecting the item the consumer intends to purchase from the database is that some of the items are included from purchases that may have occurred years ago and some of the items may have only been purchased a single time in the past. In other words, locating previously purchased items in a database can be an inconvenient undertaking due to the database being cluttered by items that are not frequently purchased and/or are no longer frequently purchased.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
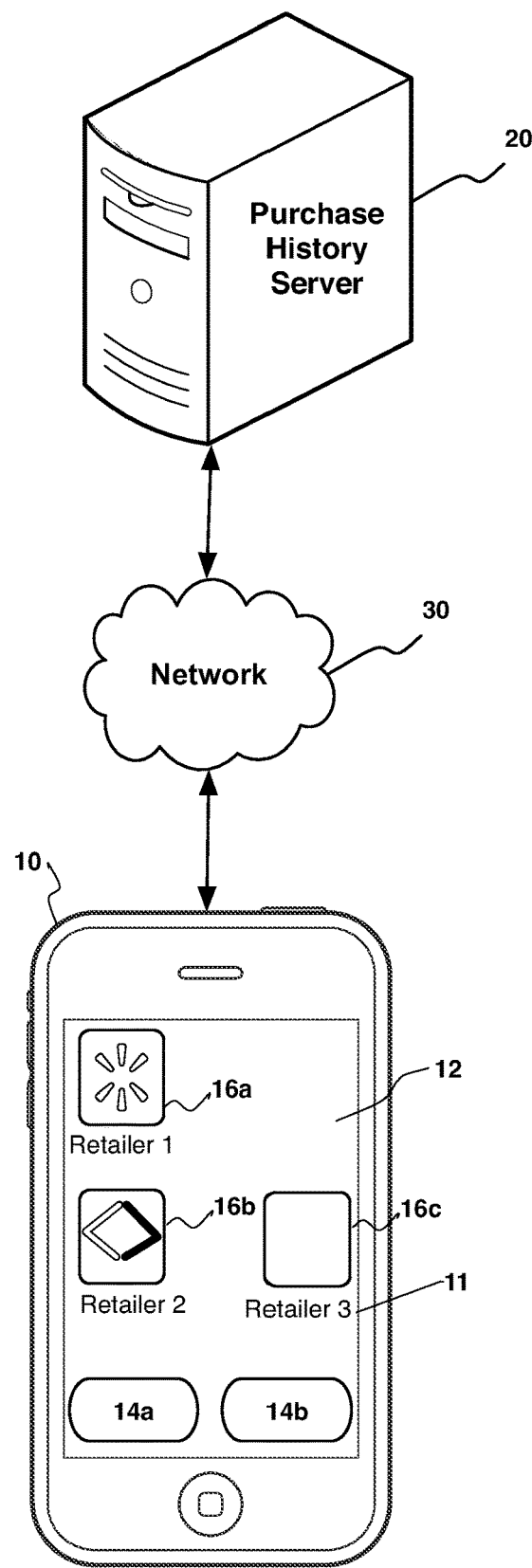
FIG. 1 schematically illustrates a purchase history server in communication with a mobile computing device displaying a graphical user interface, in accordance with the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Various embodiments include a method. The method can include a computer-implemented method using one or more processors for providing a list of frequently purchased items from at least one or more retailers, comprising: receiving, by a computer system using one or more processors, a request for a list of frequently purchased items of a user, wherein the request is received from a graphical user interface of a software program, the software program is configured for online shopping allows the user to add one or more items from a list of frequently purchased items to a current online order and comprises: a purchase history interface, comprising previously purchased items of the user from the at least one or more retailers in an un-launched state, wherein a purchase history of the user comprises the previously purchased items; and a menu to at least allow the user to (a) generate the request within a predetermined time period, as selected and adjustable by the user, and (b) view the list of frequently purchased items of the user, as requested, and as retrieved from the purchase history interface of the user; determining, with the computer system, when a previously purchased item of a plurality of purchased items of the user exceeds a frequency threshold within the pre-determined time period, as selected and adjustable by the user; when the frequency threshold is exceeded, adding the previously purchased item to the list of frequently purchased items; determining, by the computer system, whether a purchasing pattern exists for at least one item on the list of frequently purchased items within the predetermined time period, as selected and adjustable by the user, to predict a future date when the at least one item on the list of previously purchased items will be purchased by the user; displaying, on the graphical user interface of the software program, the previously purchased item on the list of frequently purchased items in chronological order such that the previously purchased item is listed first on the list of frequently purchased items when the future date, as predicted, is closer to a current date than other future dates for other items on the list of frequently purchased items; and adding, by the computer system, the one or more items from the list of frequently purchased items to the current online order selected by the user.

A number of embodiments include a system. The system can include a system for providing a list of frequently purchased items from at least one or more retailers to at least one of one or more user computing devices corresponding to a user, comprising: one or more processors programmed to execute computer-readable instructions, wherein, when the one or more processors execute the computer-readable instructions, the one or more processors are programmed to operate as: a receiving server that receives a request of the user to generate the list of frequently purchased items, the request of the user received from the at least one of the one or more user computing devices; and a frequently purchased server; one or more non-transitory memory storage systems and a memory device comprising at least a user database and a shopping cart database; and a communications device that communicates with the at least one of the one or more computing devices of the user; wherein the memory device stores computing instructions configured to run one or more programs on the one or more computer processors, the one or more programs comprising instructions for: receiving the request of the user for a list of frequently purchased items of the user, wherein the request is received from a graphical user interface of a software program, the software program is configured for online shopping allows the user to add one or more items from a list of frequently purchased items to a current online order comprises: a purchase history interface, comprising previously purchased items of the user from the at least one or more retailers in an un-launched state, wherein a purchase history of the user comprises the previously purchased items; and a menu to at least allow the user to (a) generate the request within a predetermined time period, as selected and adjustable by the user, and (b) view the list of frequently purchased items of the user, as requested, and as retrieved from the purchase history interface of the user; determining when a previously purchased item of a plurality of purchased items of the user exceeds a frequency threshold within the pre-determined time period, as selected and adjustable by the user; when the frequency threshold is exceeded, adding the previously purchased item to the list of frequently purchased items; determining whether a purchasing pattern exists for at least one item on the list of frequently purchased items within the predetermined time period, as selected and adjustable by the user, to predict a future date when the at least one item on the list of previously purchased items will be purchased by the user; displaying, on the graphical user interface of a software program, the previously purchased item on the list of frequently purchased items in chronological order such that the previously purchased item is listed first on the list of frequently purchased items when the future date, as predicted, is closer to a current date than other future dates for other items on the list of frequently purchased items; and adding the one or more items from the list of frequently purchased items to the current online order selected by the user.

In the following description, numerous specific details are set forth in order to provide a thorough understanding of the present invention. Techniques for allowing a user to select an item the user intends to purchase from a list of frequently purchased items that includes items previously purchased by the user are described herein. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

It may be desirable to allow users to use the capabilities of their computing devices to purchase products being offered for sale by a retailer. The term "product" can refer to groceries, foods, office supplies, clothing wares, or any other fungible goods sold by the retailer. Furthermore, many users typically purchase products that they have previously purchased. Techniques for allowing a user to select an item the user intends to purchase from a list of frequently purchased items are described herein, are described herein. The term "user" can refer to a potential consumer, customer or shopper at the retailer.

Some users utilize the capabilities of their computing devices to obtain and view information. For example, a user may request a purchase history server to generate a list of frequently purchased items by selecting a graphical element related to the request that is displayed in a graphical user interface (GUI) of a computing device. After the purchase history server generates the list of frequently purchased items, the list can be transmitted to the computing device for display in the GUI. Thereafter, the user can provide a user input to select one or more of the frequently purchased items. In an exemplary embodiment, the user can provide the user input by touching a frequently purchased item displayed in the GUI. The selected items may then be added to an electronic shopping cart corresponding to the user or an electronic shopping list. In an exemplary embodiment, the user can provide a user input to an operational input, e.g., "one-tap" button, that is displayed in the GUI to add the items the user has selected to the electronic shopping cart or electronic shopping list. Items that have been added to the electronic shopping cart may be purchased through an electronic checkout. As used herein, the term "computing device" can refer to mobile computing devices, such as mobile telephones, laptop computers, and tablet computers, or stationary computing devices.

In accordance with various embodiments of the present disclosure, techniques are described for obtaining a purchase history of a user indicating one or more purchased items. As used herein, the term "item" can refer to any type of indicator of a product sold by a retailer and the term "purchased item" can refer to a purchased product previously bought by a user from the retailer. Further, the term "purchase history" can refer to a list of purchased items.

Furthermore, techniques are described for generating the list of items frequently purchased by a user from a retailer. An item can be indicative of "frequently purchased" when that item is included in a purchase history of the user and includes a number of purchases within a predetermined time period that exceeds a frequency threshold. For instance, an item that has been previously purchased by the user more than two (2) times in a one (1) month time period may be indicative of being frequently purchased, wherein one month corresponds to the predetermined time period and two purchases corresponds to the frequency threshold. Accordingly, a number of purchases for each of a plurality of purchased items within a predetermined time period are compared to the frequency threshold and the list of frequently purchased items is generated to only correspond to the purchased items having a number of purchases (within the predetermined time period) that exceeds the frequency threshold. In some embodiments, the user can adjust the predetermined time period and/or the frequency threshold to filter out purchased items purchased a while back that may not be of interest to the user. Likewise, the user can adjust the predetermined time period and/or the frequency threshold to ensure that some purchased items that are of interest to the user, but were purchased a while back, are included in the list of frequently purchased items.

Techniques are further described for sequentially ordering the generated list of frequently purchased items based on at least one of the number of purchases (within the predetermined time period) and a date of each purchase for each of the frequently purchased items. In general, it is desirable to arrange frequently purchased items that have been purchased more often and more recent to the top of the generated list of frequently purchased items. In some embodiments, a determination can be made whether a purchasing pattern exists based on a date of each purchase for each of the frequently purchased items. For those frequently purchased items having a respective purchasing pattern, a prediction of whether or not each respective purchasing pattern indicates a potential purchase on a current date can be performed. Accordingly, the list of frequently purchased items can arrange frequently purchased items having purchasing patterns indicative of the potential purchase on the current date prior to the remaining frequently purchased items that are sequentially ordered based on at least one of the number of purchases and the date of each purchase.

FIG. 1 illustrates a computing device 10 in communication with a purchase history (PH) server via network 30. While one PH server 20 is illustrated, the term "purchase history server" refers to one or more servers that operate in an individual or distributed manner. As used herein, the term "network" can refer to any communication network including, but not limited to, a wireless network, a cellular network, an intranet, the Internet, or combinations thereof. In the illustrated example, the computing device 10 is a mobile computing device displaying a graphical user interface (GUI) 12 on a touch screen 11 of the computing device 10. While a touch screen 11 is illustrated, it should be appreciated that other user interfaces can be used to allow a user to interact with the computing device 10. While a mobile computing device is illustrated, it should be appreciated that a stationary computing device could be equivalently used to carry out the present techniques.

The GUI 12 allows a user to interact with the computing device 10. The GUI 12 may display at least one operational input, e.g., push buttons 14a and 14b, that allows the user to provide a command to the computing device 10, the command causing the computing device 10 to perform one or more operations. The GUI 12 may additionally display one or more graphical elements, shown here as icons 16a, 16b and 16c, that may be selected via the touch screen 11. Graphical elements, such as icons 16a, 16b and 16c, may represent various layers, windows, screens, templates, elements, or other components that may be displayed in some or all areas of the GUI 12 upon selection by the user. Furthermore, selection of a graphical element may lead to a hierarchical navigation process, such that selection of a graphical element (e.g., icon 16a) leads to a screen/display that includes one or more additional graphical elements. Textual indicators, e.g., "Retailer 1", "Retailer 2", "Retailer 3", may be displayed on or near the icons 16a-c to facilitate user interpretation of each graphical element. It should be appreciated that the GUI 12 may include various components arranged in hierarchical and/or non-hierarchical structures.

When a graphical element, e.g., icon 16a, is selected, the device 10 may be configured to open an application associated with that element and display a corresponding screen. For example, when icon 16a is selected, the device may open a shopping program and display a shopping menu displaying various tools and features available in the shopping program. For each application, screens may be displayed in the GUI 12 that include various user interface elements. In one embodiment, a screen displayed in the GUI 12 can include a graphical element that upon receiving a user input can direct the user to another screen for viewing frequently purchased items. In response to the user input, a request to generate the list of frequently purchased items can be transmitted to the PH server 20. The request can include a user identifier, e.g., a user name. The PH server 20 can include a processing device that receives the request and retrieves a purchase history, i.e., one or more purchased items, of the user from a user database using the user identifier. From the purchase history, the processing device of the PH server 20 monitors a number of purchases for each of the purchased items within a predetermined time period, wherein the list of frequently purchased items is generated based on the monitored number of purchases for each of the purchased items. Specifically, the number of purchase for each purchased item is compared to a frequently threshold and only the purchased items having a number of purchases exceeding the frequency threshold are included in the generated list of frequently purchased items.

In one embodiment, the PH server 20 sequentially orders the list of frequently purchased items from a frequently purchased item having a greatest number of purchases within the predetermined time period to a frequently purchased item having a least number of purchases within the predetermined time period. In another embodiment, the PH server 20 can monitor a date of each purchase for each frequently purchased item and sequentially order the list of frequently purchased items from a frequently purchased item having a most recent date of last purchase to a frequently purchased item having a least recent date of last purchase. In yet another embodiment, the PH server 20 can determine whether a respective purchasing pattern exists for each frequently purchased item based on the date of each purchase. A prediction can be made whether or not each frequently purchased item having a respective purchasing pattern indicates a potential purchase on a current date. The PH server 20 can then arrange the list of frequently purchased items such that frequently purchased items having purchasing patterns indicative of the potential purchase on the current date are listed first. It will be appreciated that the list of frequently purchased items can be sequentially ordered based on any combination of number of purchases and date of each purchase for each frequently purchased item using techniques such as weighting that may be adjusted by the user.

The PH server 20 can then transmit the list of frequently purchased items to the computing device 10 via the network 30 for display in the GUI 12. Once received by the computing device 10, the generated list of frequently purchased items can prompt the computing device to display one or more graphical elements in the GUI 12 that allow the user to select respective ones of the frequently purchased items. The one or more graphical elements are displayed in relation to the one or more frequently purchased items to which they correspond. Additionally, the generated list of frequently purchased items can further prompt the computing device 10 to display an operational input, e.g., button 14b, in the GUI 12 that displays information related to an inquiry requested by the retailer and allows the user to provide a command that causes the computing device to perform at least one operation related to the inquiry. In one example, the command can be in response to an inquiry by the retailer to add frequently purchased items selected by the user to an electronic shopping cart corresponding to the user. In another example, the command can be in response to an inquiry by the retailer to add frequently purchased items selected by the user to an electronic shopping list corresponding to the user.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Any combination of one or more computer-usable or computer-readable media may be utilized by the processing device of the PH server 20. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Figure 2:
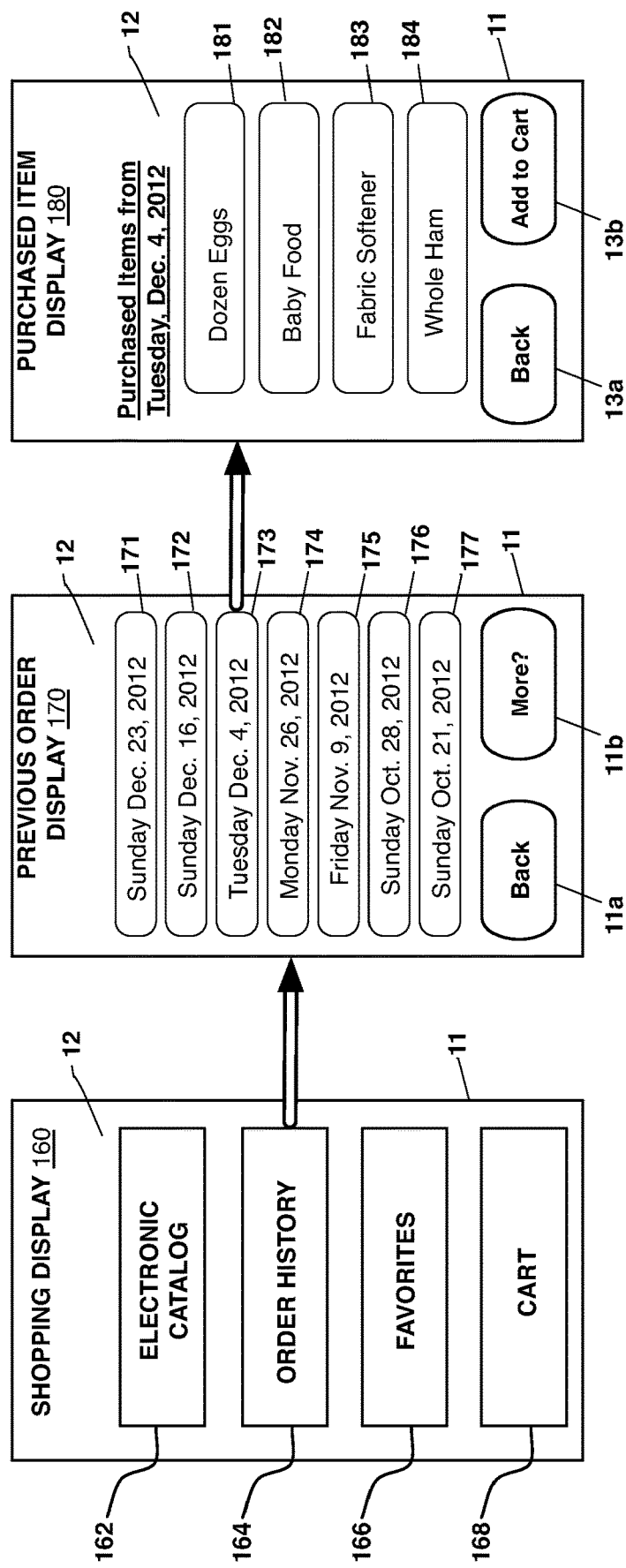
FIG. 2 schematically illustrates a non-limiting example for selecting an item a user intends to purchase from one or more previous orders within an order history of the user, in accordance with the present disclosure.

FIG. 2 schematically illustrates a non-limiting example for selecting an item a user intends to purchase from one or more previous orders within an order history of the user, in accordance with the present disclosure. FIG. 2 includes an illustration of the GUI 12 displayed upon the touch screen of the computing device 10 of FIG. 1. Screens for a shopping display 160, a previous order display 170 and a purchased item display 180 are illustrated in FIG. 2.

The shopping display 160 includes graphical elements 162, 164, 166 and 168, e.g., buttons. Upon selection of the "Electronic Catalog" button 162, the GUI 12 may be advanced to a screen that allows a user to search and browse items offered for sale by the retailer. Upon selection of the "Cart" button 168, the GUI 12 may be advanced to a screen that allows a user to view items contained in an electronic shopping cart corresponding to the user. Upon selection of the "Favorites" button 166, the GUI 12 may be advanced to a database including every item the user has previously purchased. It will be appreciated that previously purchased items included in the database may be organized by departments of the retailer; however, the database may include items previously purchased in the distant past or only purchased on one occasion. Accordingly, due to a vast amount of clutter from a multitude of previously purchased items included in the database, searching for an item during a re-order can be inefficient. Upon selection of the "Order History" button 164, the GUI 12 may be advanced to the previous order display 170 to search and browse for items contained in previous orders arranged by date.

Referring to the previous order display 170, a plurality of previous orders are displayed in the GUI 12. The previous orders are arranged by a date of when that order occurred. Each previous order may correspond to respective ones of graphical elements 171-177 which are displayed in relation to the previous order for which they correspond. The graphical elements 171,177, e.g., buttons, allow the user to view items previously purchased in the previous orders as indicated by the respective graphical element. The previous order display 170 further includes graphical elements comprising operational inputs 11a and 11b. Upon selection of operational input 11a, the GUI 12 may be directed back to the shopping display 160. Upon selection of operational input 11b, the GUI 12 may display additional previous orders. Upon selection of the "Tuesday Dec. 4, 2012" button, the GUI 12 may be advanced to the purchased item display 180 to search and browse a plurality of previously purchased items during the previous order that occurred on Tuesday, Dec. 4, 2012.

Referring to the purchased item display 180, a plurality of previously purchased items are listed. Each purchased item may correspond to respective ones of graphical elements 181-184 that are displayed in relation to the purchased items to which they correspond. The graphical elements 181-184, e.g. buttons, allow the user to select the respective previously purchased item. It will be appreciated that only four items are listed, however more or less items can be listed depending on how many items were purchased during the previous order. Accordingly, the GUI 12 can include a graphical element enabling the display 180 to scroll through additional items. The purchased item display 180 further includes graphical elements comprising operational inputs 13a and 13b. Upon selection of operational input 13b, the GUI 12 may provide a command to the computing device 10 to add any items selected by the user to the electronic shopping cart. If an item the user intends to purchase is not displayed upon the purchased item display, the user may select operational input 13a to direct the GUI 12 back to the previous order display 170 so that the user can view another one of the previous orders to try to locate the item the user intends to purchase.

It is apparent in the non-limiting example of FIG. 2 that it can be a hassle for a user to remember which previous order contains the item the user is looking for, in addition to the multiple navigation steps involved to find the previous order containing the item the user intends to purchase. The illustrated non-limiting example of FIG. 2 simply does not tailor the previously purchased items based on past purchasing behavior of the user.

Figure 3A:
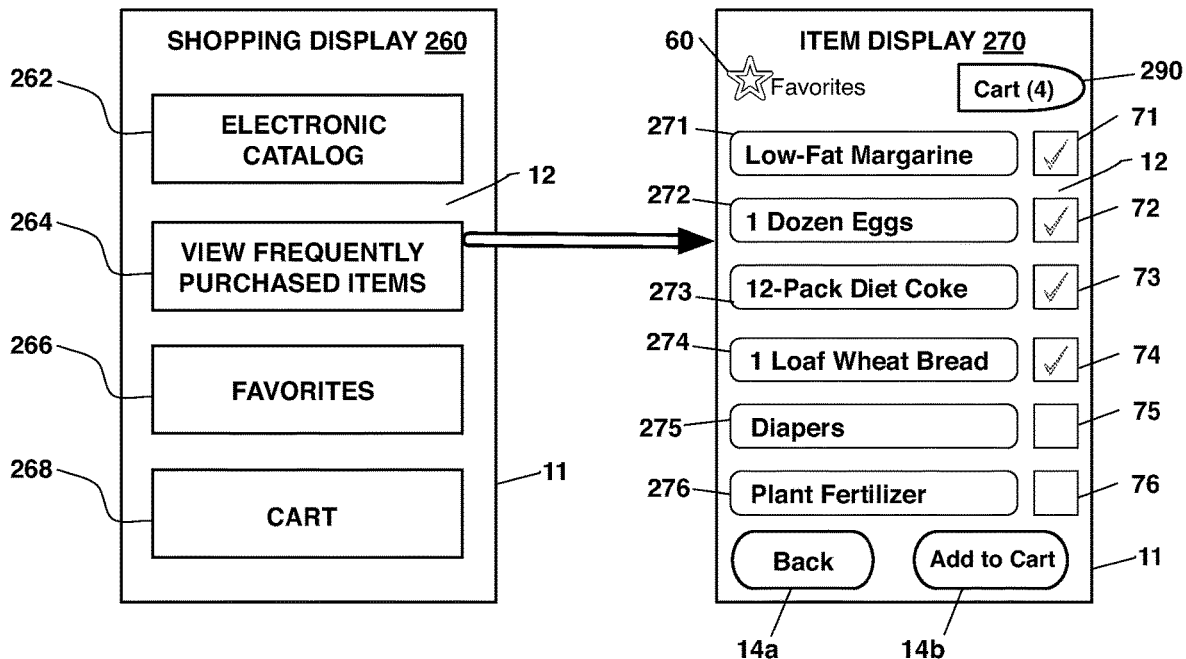
FIGS. 3A-3B schematically illustrate non-limiting examples for methods of providing one or more items frequently purchased by a user for display upon a computing device corresponding to the user, in accordance with the present disclosure.
Figure 3B:
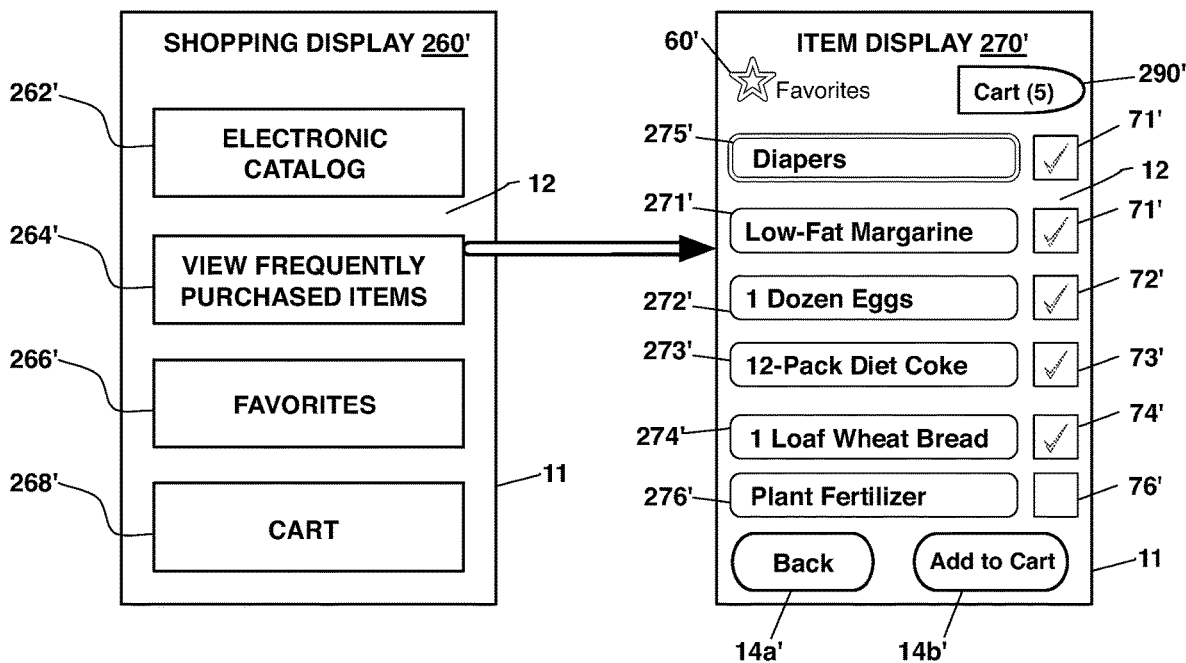

FIGS. 3A-3B schematically illustrate non-limiting examples for methods of providing one or more items frequently purchased by a user for display upon a computing device corresponding to the user, in accordance with the present disclosure. Each of FIGS. 3A-3B include the GUI 12 displayed upon the touch screen of the computing device 10 of FIG. 1. Screens for a shopping display 260, 260' and an item display 270, 270' are illustrated in FIGS. 3A-3B. The shopping display 260, 260' is identical to the shopping display of FIG. 2 except that graphical element 264, 264' replaces the graphical element 164, e.g., "Order History" button. The graphical element 264, 264', e.g., button, corresponds to a "View frequently purchased items" operation. In some embodiments, selection of a graphical element including one of icons 16a-c of FIG. 1, may advance the computing device 10 to the shopping display 260, 260'. The shopping display 260, 260' serves as a gateway for selecting items the user intends to purchase that have been previously and frequently purchased by the user.

Upon selection of the "View frequently purchased items" button 264, 264', the GUI 12 is advanced to the item display 270, 270' to search and browse a generated list of frequently purchased items. In response to a user input selecting the "View frequently purchased items" button 264, 264', a request to generate the list of frequently purchased items is transmitted to the processing device of the PH server 20 of FIG. 1. The processing device then retrieves the purchase history of the user from a user database using a user identifier received with the request. As aforementioned, a number of purchases for each of the purchased items in the purchase history are monitored within a predetermined time period. The list of frequently purchased items is then generated by the processing device based on the monitored number of purchased for each of the purchased items. Specifically, only purchased items having a number of purchases that exceeds a frequency threshold are indicative of being "frequently purchased". In one embodiment, the user can adjust the length of the predetermined time period and/or the frequency threshold in an effort to filter out or include additional previously purchased items.

Referring to the item display 270 of FIG. 3A, the list of frequently purchased items generated by the PH server 20 is displayed. Each frequently purchased item may correspond to respective ones of graphical elements 271-276 displayed in relation to the frequently purchased items to which they correspond. The graphical elements 271-276 allow the user to select a frequently purchased item. When selected, the graphical element 271-276 may be emphasized through highlighting, flashing or changing color. Additionally or alternatively, graphical elements 71-76, e.g., check boxes, may be displayed in relation to the frequently purchased items to which they correspond, wherein the check boxes 71-76 allow the user to select the respective previously purchased item and/or serve as an indicator for a frequently purchased item selected. When selected, the check boxes 71-76 may include a "check" graphic. In one embodiment, the check boxes 71-76 include the "check" graphic when the user touches respective ones of graphical elements 271-276. In some embodiments, selection of graphical elements 271-276 advances the GUI 12 to a screen providing detailed information relating to the selected item and the check boxes 70a-70f are used to select frequently purchased items for an upcoming purchase. The graphical elements 271-276 and/or 71-76 are prompted by the computing device 10 for display in the GUI 12 when the generated list of frequently purchased items is received by the computing device 10.

In the non-limiting example, the list of frequently purchased items includes Low-Fat Margarine, 1 Dozen Eggs, 12-pack Diet Coke, 1 Loaf Wheat Bread, Diapers and Plant Fertilizer. In a non-limiting example, the predetermined time period corresponds to one month and the frequency threshold corresponds to one purchase. Accordingly, each of the frequently purchased items have been purchased at least one time during the last month. As aforementioned, the generated list of frequently purchased items may be sequentially ordered based on at least one of the number of purchases and the date of each purchase for each of the frequently purchased items. For example, the list of frequently purchased items may be sequentially ordered from a frequently purchased item having a greatest number of purchases within the predetermined time period to a frequently purchased item having a least number of purchases within the predetermined time period. Likewise, the list of frequently purchased items may be sequentially ordered from a frequently purchased item having a most recent date of last purchase to a frequently purchased item having a least recent date of last purchase. In a non-limiting example, the Low-fat Margarine, the 1 Dozen Eggs, the 12-pack Diet Coke and the 1 Loaf Wheat Bread may have been purchased by the user two times during the last two weeks, whereas the Diapers and the Plant Fertilizer were only purchased one time three weeks ago.

The item display 270 further includes graphical elements comprising operational inputs 14a and 14b, e.g., buttons, which are prompted by the computing device 10 for display in the GUI when the generated list of frequently purchased items is received. Upon selection of operational input 14a, e.g., "Back" button, the GUI 12 may be directed back to the shopping display 260. Upon selection of operational input 14b, e.g., "Add to Cart" button, a command is performed causing the computing device 10 to add frequently purchased items selected by the user to the electronic shopping cart. For instance, the command may cause the computing device 10 to transmit the selected frequently purchased items to the PH server 20 that maintains the electronic shopping cart corresponding to the user. In the non-limiting example, the user has selected the Low-Fat Margarine, the 1 Dozen Eggs, the 12-Pack Diet Coke and the 1 Loaf of Wheat Bread. Thus, when the "Add to Cart" button 14b receives a user input, the computing device is commanded to add the selected items to the electronic shopping cart.

The item display 270 may further include graphical element 290, e.g., button, which may advance the user to the electronic shopping cart corresponding to the user. As used herein, the term "electronic shopping cart" can refer to a list of one or more items selected by a user indicating products that the user intends to purchase. In the illustrated embodiment, the electronic shopping cart button 290 currently includes four (4) items corresponding to the selected Low-Fat Margarine, the 1 Dozen Eggs, the 12-Pack Diet Coke and the 1 Loaf of Wheat Bread after the user has selected the "Add to Cart" button 14b, as indicated by a textual indicator displaying a "(4)". The item display 270 may further include graphical element 60, e.g., button, that may advance the user to a "Favorites" database storing every item the user has previously purchased. It will be appreciated that the "Favorites" database may be stored within a user database as part of the purchase history of the user and maintained by the retailer at the PH server 20. In some embodiments, the "Favorites" database is updated to only include the list of frequently purchased items as described herein. For instance, the "Favorites" database when selected by graphical element 60 or through "Favorites" button 266 on the shopping display 260, may include the list of frequently purchased items as illustrated in the item display 270. Embodiments are further envisioned to include another operational input that commands the computing device 10 to add selected frequently purchased items to an electronic shopping list and a graphical element that directs the GUI 12 to the electronic shopping list corresponding to the user.

Referring to FIG. 3B, like numerals of the shopping display 260' and the item display 270' correspond to like features of the shopping display 260 and the item display 270 illustrated in FIG. 3A. The GUI 12 is advanced from the shopping display 260' to the item display 270' in response to a user input selecting the "View frequently purchased items" button 264'.

Referring to the item display 270', the Diapers are arranged prior to the sequentially ordered frequently purchased items based on at least one of the number of purchases and the date of each purchase. As previously mentioned, the PH server 20 can determine whether a respective purchasing pattern exists for each frequently purchased item. In the illustrated embodiment, the Diapers are predicted to include a purchasing pattern that indicates a potential purchase on the current date. For instance, the purchasing pattern for the Diapers can be predicted to indicate that the user always purchases diapers every three weeks, and that it has been three weeks since the last purchase. Accordingly, the PH server 20 can arrange the list of frequently purchased items such that the Diapers are listed prior to any sequentially ordered frequently purchased products. In the illustrated embodiment, Diapers are arranged or ordered to the top of the list of frequently purchased items. In one example, as shown in the illustrated embodiment of FIG. 3B, the graphical element 275' corresponding to the Diapers may include added emphasis to gain the attention of the user so that the user is aware of the potential purchase on the current date. After selection of the "Add to Cart" button 14b, the electronic shopping cart button 290' currently includes five (5) items indicative of the Diapers, the Low-Fat Margarine, the 1 Dozen Eggs, the 12-Pack Diet Coke and the 1 Loaf of Wheat Bread selected by the user, as indicated by a textual indicator displaying a "(5)". It will be understood that the electronic shopping cart button 290, 290' may include additional items added by the user using one or more different ordering processes during the order, i.e., selecting items from the electronic catalog or the favorites database.

Figure 4:
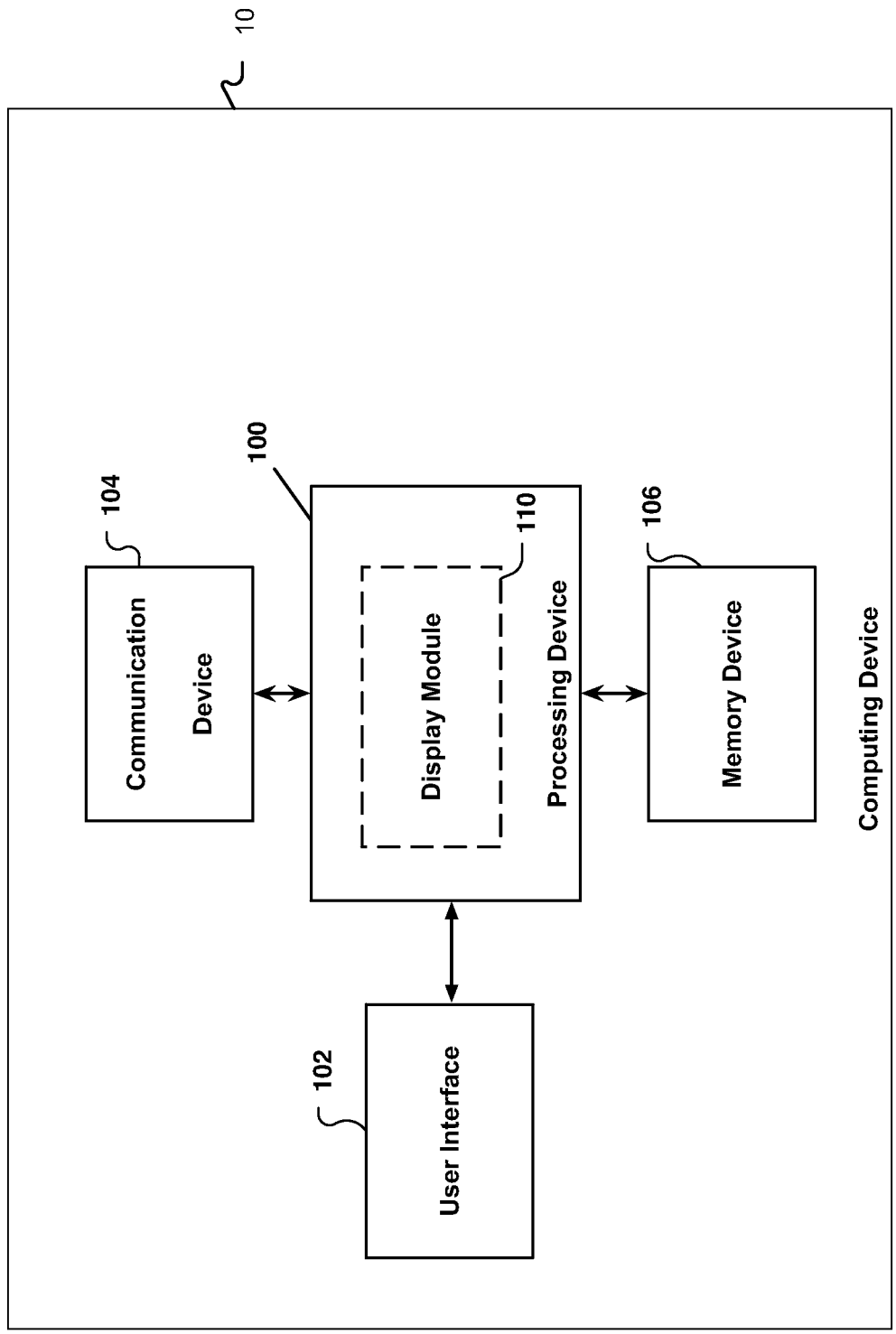
FIG. 4 is a block diagram illustrating components of the computing device of FIG. 1.

Referring now to FIG. 4, a block diagram illustrating example components of the computing device 10 of FIG. 1 is depicted. In the example embodiment, the computing device 10 includes a processing device 100, a user interface 102, a communication device 104, and a memory device 106.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the computing device. In the illustrative embodiment, the processing device 100 also includes a display module 110 for displaying a list of frequently purchased items transmitted from the PH server 20 of FIG. 1. The display module 110 may provide a graphical element in the GUI 12 and allow the user to request to generate the list of frequently purchased items. The display module 110 may additionally provide graphical elements in the GUI 12 displayed in relation to the frequently purchased items to which they correspond which allow the user to select items the user intends to purchase. Further, the display module 110 may provide the operational input in the GUI 12 and allow the user to add selected frequently purchased items to an electronic shopping cart corresponding to the user. The display module 110 may additionally display other graphical elements in the GUI 12 allowing the user to select each graphical element through touching or tapping.

The user interface 102 is a device that allows a user to interact with the computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the PH server 20, via the network 30. The communication device 104 can include one or more wireless transceivers for performing wireless communication and/or one or more communication ports for performing wired communication. The memory device 106 is a device that stores data generated or received by the computing device 10. The memory device 106 can include, but is not limited to a hard disc drive, an optical disc drive, and/or a flash memory drive. The memory device 106 can include storage for items added to an electronic shopping list corresponding to the user.

Figure 5:
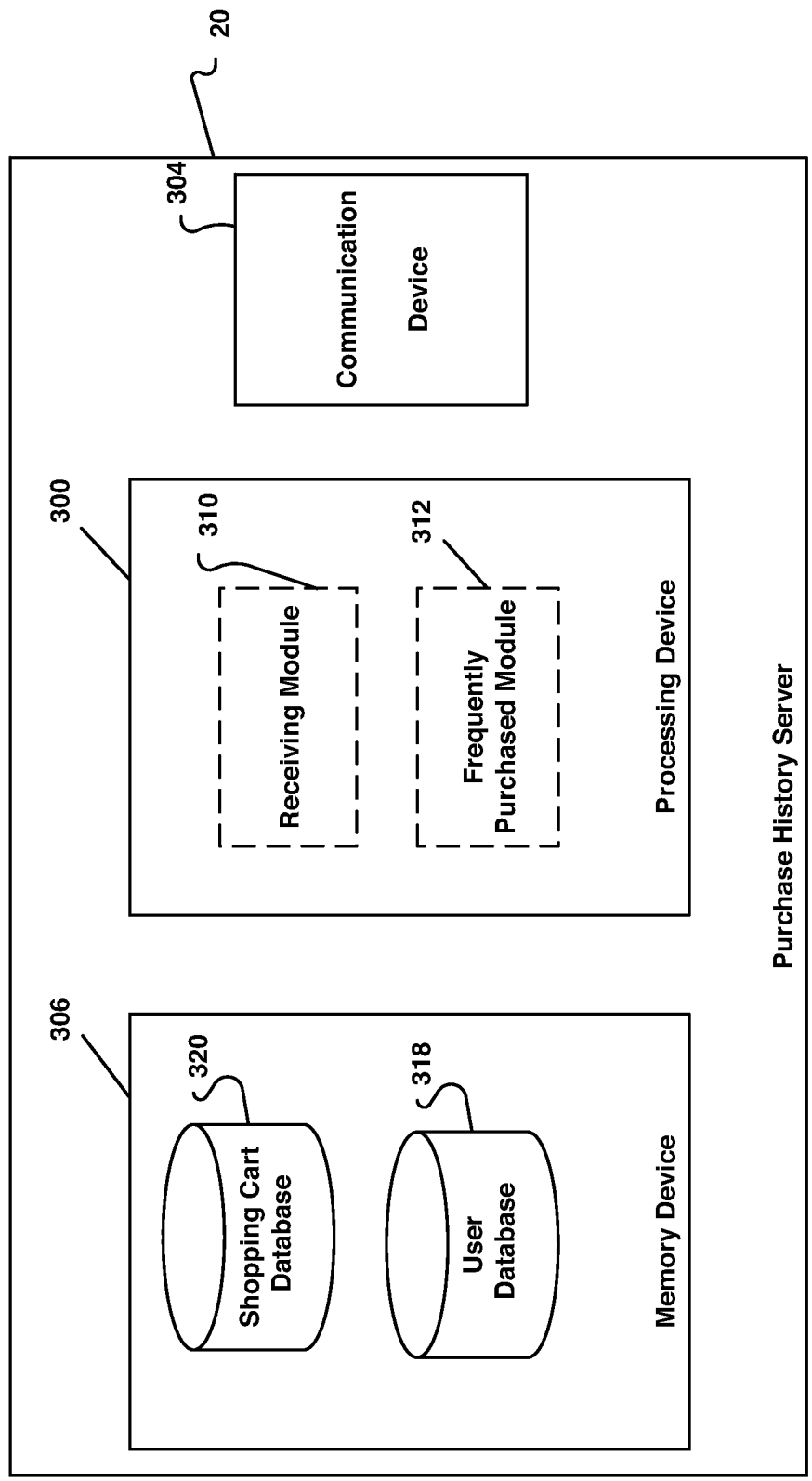
FIG. 5 is a block diagram illustrating components of the purchase history server of FIG. 1.

Referring now to FIG. 5, a block diagram illustrating an exemplary purchase history server 20 is depicted. In an exemplary embodiment, the purchasing server 20 includes a processing device 300, a communication device 304, and memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes a receiving module 310 and a frequently purchased module 312, which are described in greater detail below.

The receiving module 310 receives a request to generate a list of frequently purchased items when the computing device has selected a graphical element. Further, the receiving module module 310 receives a user identifier transmitted from the computing device 10 when the request to generate the list of frequently purchased items is received. The request and the user identifier may be broadcasted via the network 30 of FIG. 1. The computing device 10 can request to generate the list of frequently purchased items when the user selects "View frequently purchased items" button 264, 264' as discussed above in the non-limiting examples provided in FIGS. 3A-3B.

The frequently purchased (FP) module 312 obtains a purchase history of the user in response to the request to generate the list of frequently purchased items. The purchase history includes a plurality of purchased items, each purchased item indicating a different product previously purchased by the user from the retailer. For instance, the purchase history may include every product the user has ever purchased. The FP module 312 further monitors a number of purchases for each of the purchased items within a predetermined time period and compares the number of purchases for each purchased item to a frequency threshold. In one embodiment, the predetermined time period and/or the frequency threshold may be arbitrarily selected by the retailer; however, the user may adjust the length of the predetermined time period and the magnitude of the frequency threshold. In another embodiment, the predetermined time period and/or the frequency threshold may be selected by the user and stored as user profile information in a user database. The list of frequently purchased items, corresponding only to the purchased items having a number of purchases that exceeds the frequency threshold, is generated by the FP module 312. Thereafter, the generated list of frequently purchased items is transmitted to the computing device 10. It is generally desirable for the FP module 312 to arrange the list of frequently purchased items such that items having been purchased more often and more recent are at the top of the generated list of frequently purchased items. The FP module 312 can further arrange frequently purchased items having purchasing patterns indicative of a potential purchase on a current date prior to frequently purchased items sequentially ordered based on at least one of the number of purchases and the date of each purchase, as discussed above in the non-limiting examples provided in FIGS. 3A-3B The transmitted generated list of frequently purchased items prompts the computing device 10 to display one or more graphical elements, e.g., buttons 271-276 and/or buttons 71-76, in the GUI 12 which allow the user to select respective ones of the frequently purchased items. The transmitted generated list of frequently purchased items further prompts the computing device to display an operational input, e.g., "Add to Cart" button 14b, in the GUI 12 that allows the user to provide a command to the computing device 10. The command may cause the computing device 10 to add frequently purchased items selected by the user to an electronic shopping cart or an electronic shopping list corresponding to the user. Thereafter, the FP module 312 can receive the command from the computing device 10 and store the selected frequently purchased items in a shopping cart database 320 maintained by the retailer at the PH server 20.

The communication device 304 is a device that allows the purchasing server 20 to communicate with another device, e.g., the computing device 10, via the network 30. The communication device 304 can include one or more wireless transceivers for performing wireless communication and/or one or more communication ports for performing wired communication.

The memory device 306 is a device that stores data generated or received by the purchasing server 20. The memory device 306 can include, but is not limited to, a hard disc drive, an optical disc drive, and/or flash memory drive. Further, the memory device 306 may be distributed and located at multiple locations. The memory device 306 is accessible to the processing device 300.

A user database 318, or similar structure, can be stored in the memory device 306. In an exemplary embodiment, the retailer maintains the user database 318 to store purchase histories for a plurality of users. The FP module 312 retrieves the purchase history of the user using a user identifier, e.g., a user name, broadcasted from the computing device 10 in response to the request to generate the list of frequently purchased items via a user input to an operational input, e.g., "View previously purchased items" button 264, 264'. The FP module 312 can thereby monitor the number of purchases for each purchased item in the purchase history of the user within a predetermined time period, compare the number of purchases to a frequency threshold, and generate the list of frequently purchased items corresponding only to the purchased items having a number of purchases that exceeds the frequency threshold.

Additionally, a shopping cart database 320, or similar structure, can be stored in the memory device 306. In an exemplary embodiment, a retailer maintains the shopping database 320 to input and store items selected by users that are intended to be purchased at an electronic checkout. For instance, a user may select items the user intends to purchase from a list of frequently purchased items and add the items to an electronic shopping cart corresponding to the user, wherein the FP module 312 stores the selected items in in the shopping cart database 320. The shopping cart database 320 may remove items once they have been purchased. Likewise, the shopping cart database 320 may remove items stored therein upon a designated period of time expiring.

Figure 6:
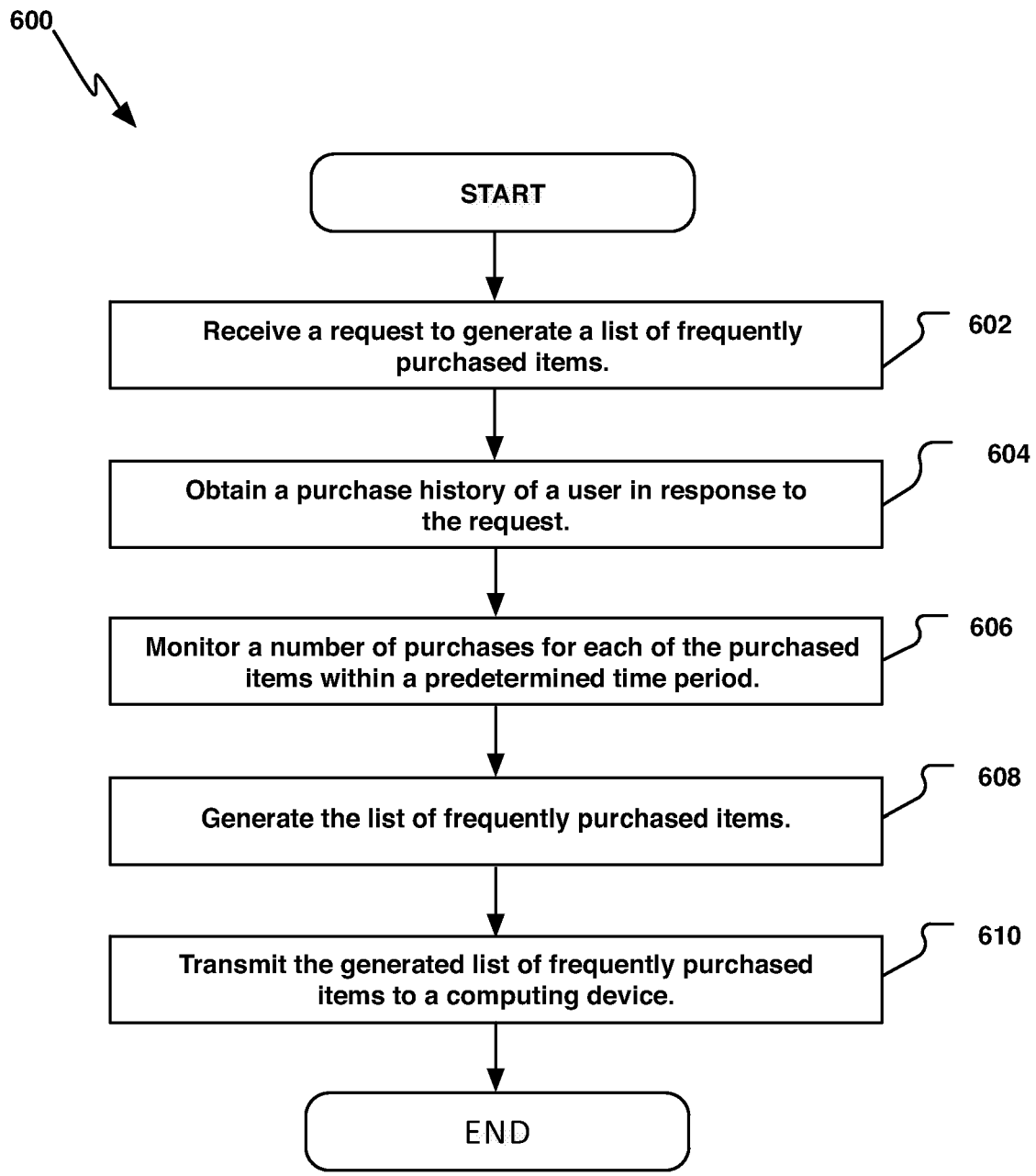
FIG. 6 is a flowchart illustrating an example method for generating a list of frequently purchased items from a purchase history of a user, in accordance the present disclosure.

The flowchart and block diagrams in the flow diagrams illustrate the architecture, functionality, and operation of possible implementations of methods and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

is a flowchart illustrating an example method for generating a list of frequently purchased items from a purchase history of a user FIG. 6 illustrates an example method of a flowchart 600 that can be executed by the PH server 20 for generating a list of frequently purchased items form a purchase history of a user. At operation 602, a request to generate the list of frequently purchased items is received from a computing device corresponding to a user. The receiving module 310 of the PH server 20 receives the request. The receiving module 310 may additionally receive a user identifier, e.g., a user name, corresponding to the user that is transmitted from the computing device 10 with the request. At operation 604, the frequently purchased (FP) module 312 obtains a purchase of the user that includes a plurality of purchased items, each purchased item indicating a different purchased product previously purchased by the user from the retailer. As aforementioned, the FP module 312 can obtain the purchase history by retrieving the purchase history from the user database 318 using the user identifier.

At operation 606, the FP module 312 monitors a number of purchases for each of the purchased items within a predetermined time period. The FP module 312 then compares the number of purchases for each of the purchased items to a frequency threshold. As aforementioned, the predetermined time period and the frequency threshold can be arbitrarily selected by the retailer, adjusted by the user, or selected by the user and stored in the user database 318 as user profile information.

At operation 608, the FP module 312 generates the list of frequently purchased items based on the monitored number of purchases for each of the purchased items. Specifically, the generated list corresponds only to the purchased items having a number of purchases that exceeds the frequency threshold. In some embodiments, the generated list of frequently purchased items is sequentially ordered based on any combination of the number of purchases and a date of each purchase for each of the frequently purchased items, as discussed above in the non-limiting examples provided in FIGS. 3A-3B. Additionally, if a respective purchasing pattern is predicted for one or more of the frequently purchased items that indicates a potential purchase on a current date, the one or more frequently purchased items indicative of the potential purchase on the current date can be arranged prior to frequently purchased items that are sequentially ordered, as discussed above in the non-limiting example provided in FIG. 3B.

At operation 610, the FP module 312 transmits the generated list of frequently purchased items to the computing device 10. Once the generated list of frequently purchased items is received at the computing device 10, the computing device can be prompted to display one or more graphical elements in the GUI 12. The one or more graphical elements allow the user to select respective ones of the frequently purchased items. The one or more graphical elements can include buttons 271-276 and/or buttons 71-76 discussed above in the non-limiting examples provided in FIGS. 3A-3B. Further, the transmitted list of frequently purchased items prompts the computing device to display an operational input in the GUI which displays information related to an inquiry, e.g., "Add to Cart" or "Add to Shopping List", requested by the retailer and allows the user to provide a command to the computing device. In one embodiment, the command can cause the computing device 10 to add frequently purchased items selected by the user to an electronic shopping cart, wherein the electronic shopping cart is maintained by the retailer and stored in the shopping cart database. In another embodiment, the command can cause the computing device 10 to add frequently purchased items selected by the user to an electronic shopping list corresponding to the user, wherein the electronic shopping list is stored in the memory device 106 of the computing device 10.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method using one or more processors for providing a list of frequently purchased items from at least one of one or more retailers, comprising:

receiving, by a computer system using the one or more processors, a request for the list of frequently purchased items of a user, wherein the request is received from a graphical user interface of a software program, and wherein the software program is configured for online shopping that allows the user to add one or more items from the list of frequently purchased items to a current online order and comprises:

a purchase history interface, comprising previously purchased items of the user from the at least one of one or more retailers in an un-launched state, wherein a purchase history of the user comprises the previously purchased items; and a menu to at least allow the user to (a) generate the request within a predetermined time period, as selected and adjustable by the user, and (b) view the list of frequently purchased items of the user, as requested, and as retrieved from the purchase history interface of the user;

determining, with the computer system, when a previously purchased item of a plurality of purchased items of the user exceeds a frequency threshold within the predetermined time period, as selected and adjustable by the user;

when the frequency threshold is exceeded, adding the previously purchased item to the list of frequently purchased items;

determining, by the computer system, whether a purchasing pattern exists for at least one item on the list of frequently purchased items within the predetermined time period, as selected and adjustable by the user, to predict a future date when at least one item on a list of previously purchased items will be purchased by the user;

displaying, on the graphical user interface of the software program, the previously purchased item on the list of frequently purchased items in chronological order such that the previously purchased item is listed first on the list of frequently purchased items when the future date, as predicted, is closer to a current date than other future dates for other items on the list of frequently purchased items; and adding, by the computer system, the one or more items from the list of frequently purchased items to the current online order selected by the user.

2. The computer-implemented method of claim 1, further comprising:

generating the list of frequently purchased items comprising:
comparing, with the computer system, a respective number of purchases for each of the previously purchased items to the frequency threshold, as selected and adjustable by the user; and
generating, with the computer system, the list of frequently purchased items corresponding to the previously purchased items having purchases that exceeds the frequency threshold, as selected and adjustable by the user.

3. The computer-implemented method of claim 1, further comprising:
monitoring, with the computer system, a respective date of each respective purchase for each respective purchased item of the previously purchased items, wherein the list of frequently purchased items is sequentially ordered based on at least one of a number of purchases and the respective date of each respective purchase for the each respective purchased item of the previously purchased items.

4. The computer-implemented method of claim 3, wherein the list of frequently purchased items is sequentially ordered from items of the previously purchased items having a greatest number of purchases within the predetermined time period, as selected and adjustable by the user, to items of the previously purchased items having a least number of purchases within the predetermined time period, as selected and adjustable by the user.

5. The computer-implemented method of claim 3, wherein the list of frequently purchased items is sequentially ordered from items of the previously purchased items having a most recent date of last purchase to items of the previously purchased items having a least recent date of last purchase.

6. The computer-implemented method of claim 1, further comprising:
determining, with the computer system, whether the purchasing pattern exists based on a respective date of each purchase.

7. The computer-implemented method of claim 1, further comprising:
determining the purchase history of the user comprising:
receiving, with the computer system, a user identifier included with the request of the user;
retrieving, with the computer system, the purchase history of the user from a user database using the user identifier, the user database storing purchase histories for a plurality of users; and
retrieving, with the computer system, the purchase history of the user from a shopping cart database using the user identifier, the shopping cart database storing shopping cart histories for the plurality of users maintained by a plurality of retailers.

8. The computer-implemented method of claim 1, wherein displaying, on the graphical user interface of the software program, the previously purchased item on the list of frequently purchased items further comprises:
prompting a user computing device of the user to display one or more graphical elements in the graphical user interface of the software program shown on the user computing device, the one or more graphical elements allowing the user to select respective ones of the list of frequently purchased items.

9. The computer-implemented method of claim 8, wherein displaying, on the graphical user interface of the software program, the previously purchased item on the list of frequently purchased items further comprises:
instructing the user computing device of the user to display an operational input interface on the graphical user interface of the software program, wherein the operational input interface displays information related to an inquiry requested by a retailer and allows the user to provide a command to the user computing device of the user, and wherein the command causes the user computing device to perform at least one operation related to the inquiry; and
adding frequently purchased items selected by the user from the list of frequently purchased items to an electronic shopping list corresponding to the user.

10. The computer-implemented method of claim 1, wherein the request of the user for the list of frequently purchased items of the user is generated based on input from the user selecting one or more graphical elements displayed on the graphical user interface of the software program shown on a user computing device of the user.

11. A system for providing a list of frequently purchased items from at least one of one or more retailers to at least one of one or more user computing devices corresponding to a user, comprising:
one or more processors programmed to execute computer-readable instructions, wherein, when the one or more processors execute the computer-readable instructions, the one or more processors are programmed to operate as:
a receiving server that receives a request of the user to generate the list of frequently purchased items, the request of the user received from the at least one of the one or more user computing devices; and
a frequently purchased server;
one or more non-transitory memory storage systems and a memory device comprising at least a user database and a shopping cart database; and
a communications device that communicates with the at least one of the one or more user computing devices of the user;
wherein the memory device stores computing instructions configured to run one or more programs on the one or more processors, the one or more programs comprising instructions for:
receiving the request of the user for the list of frequently purchased items of the user, wherein the request is received from a graphical user interface of a software program, wherein the software program is configured for online shopping that allows the user to add one or more items from the list of frequently purchased items to a current online order comprises:
a purchase history interface, comprising previously purchased items of the user from the at least one of one or more retailers in an un-launched state, wherein a purchase history of the user comprises the previously purchased items; and
a menu to at least allow the user to (a) generate the request within a predetermined time period, as selected and adjustable by the user, and (b) view the list of frequently purchased items of the user, as requested, and as retrieved from the purchase history interface of the user;
determining when a previously purchased item of a plurality of purchased items of the user exceeds a frequency threshold within the predetermined time period, as selected and adjustable by the user;
when the frequency threshold is exceeded, adding the previously purchased item to the list of frequently purchased items;

determining whether a purchasing pattern exists for at least one item on the list of frequently purchased items within the predetermined time period, as selected and adjustable by the user, to predict a future date when at least one item on a list of previously purchased items will be purchased by the user;

displaying, on the graphical user interface of the software program, the previously purchased item on the list of frequently purchased items in chronological order such that the previously purchased item is listed first on the list of frequently purchased items when the future date, as predicted, is closer to a current date than other future dates for other items on the list of frequently purchased items; and adding the one or more items from the list of frequently purchased items to the current online order selected by the user.

12. The system of claim 11, wherein the frequently purchased server generates the list of frequently purchased items by:

comparing a respective number of purchases for each of the previously purchased items to the frequency threshold, as selected and adjustable by the user; and generating the list of frequently purchased items corresponding to the previously purchased items having purchases that exceeds the frequency threshold, as selected and adjustable by the user.

13. The system of claim 11, wherein the frequently purchased server further:

monitors a respective date of each respective purchase for each respective purchased item of the previously purchased items, wherein the list of frequently purchased items is sequentially ordered based on at least one of a number of purchases and the respective date of each respective purchase for the each respective purchased item of the previously purchased items.

14. The system of claim 13, wherein the frequently purchased server further:

sequentially orders the list of frequently purchased items from items of the previously purchased items having a greatest number of purchases within the predetermined time period, as selected and adjustable by the user, to items of the previously purchased items having a least number of purchases within the predetermined time period, as selected and adjustable by the user.

15. The system of claim 13, wherein the frequently purchased server further:

sequentially orders the list of frequently purchased items from items of the previously purchased items having a most recent date of last purchase to items of the previously purchased items having a least recent date of last purchase.

16. The system of claim 13, wherein the frequently purchased server further:

monitors a respective date; and for the each respective purchased item of the list of frequently purchased items, determines whether the purchasing pattern exists based on the respective date of each purchase.

17. The system of claim 11, wherein the frequently purchased server further:

obtains the purchase history of the user by:

receiving a user identifier included with the request of the user received from the at least one of the one or more user computing devices;

retrieving the purchase history of the user from a user database using the user identifier, the user database storing purchase histories for a plurality of users; and retrieving the purchase history of the user from a shopping cart database using the user identifier, the shopping cart database storing shopping cart histories for the plurality of users maintained by a plurality of retailers.

18. The system of claim 11, wherein displaying, on the graphical user interface of the software program, the previously purchased item on the list of frequently purchased items further comprises:

prompting a user computing device of the user to display one or more graphical elements in the graphical user interface of the software program shown on the user computing device, the one or more graphical elements allowing the user to select respective ones of the list of frequently purchased items.

19. The system of claim 18, wherein displaying, on the graphical user interface of the software program, the previously purchased item on the list of frequently purchased items further comprises:

instructing the user computing device of the user to display an operational input interface on the graphical user interface of the software program, wherein the operational input interface displays information related to an inquiry requested by a retailer and allows the user to provide a command to the user computing device of the user, and wherein the command causes the user computing device to perform at least one operation related to the inquiry; and adding frequently purchased items selected by the user from the list of frequently purchased items to an electronic shopping list corresponding to the user.

20. The system of claim 11, wherein the request by the user for the list of frequently purchased items of the user is generated based on input from the user selecting one or more graphical elements displayed in the graphical user interface of the software program shown on a user computing device of the user.

* * * * *